Jan. 28, 1958 D. BENJAMIN 2,821,579
ELECTRICAL OUTLET CONNECTOR TYPE CORD REEL
Filed March 15, 1956

INVENTOR.
DAVID BENJAMIN
BY Oldham & Oldham
ATTYS.

United States Patent Office 2,821,579
Patented Jan. 28, 1958

2,821,579

ELECTRICAL OUTLET CONNECTOR TYPE CORD REEL

David Benjamin, Cleveland, Ohio, assignor to Benjamin Reel Products, Inc., a corporation of Ohio Application March 15, 1956, Serial No. 571,636

7 Claims. (Cl. 191—12.4)

There have been various types of electric cord reels provided heretofore, and the present invention is particularly directed to a compact, small reel adapted to be directly engaged with a conventional wall type electrical outlet.

Heretofore there have been various types of reels provided for electrical cords as used in association with various items such as vacuum sweepers, lamp bases, extension cords and the like. These reels have been of appreciable commercial success, but one field, insofar as I am aware, which never has been satisfactorily covered with electric cord reels, is the field of electric shavers. It has been proposed to provide a small or compact reel which would have a variable length of cord extending therefrom and would directly engage an electrical outlet for supply of electrical energy to an electric shaver. It is important that electrical energy be transmitted to the shaver connected to the electric cord only when it is desired to use such shaver to provide a safety factor in the appliance.

While some efforts have been made heretofore to provide compact useful cord reels for electric shavers, none of such constructions have been acceptable commercially.

Accordingly, it is the general object of the present invention to provide a novel and improved electric cord reel specifically adapted for use with electric shaver units.

Another object of the invention is to provide a compact, sturdy electric cord reel characterized by its ability to be quickly secured to and carried by a conventional electric wall outlet receptacle.

Another object of the invention is to provide an electric cord reel wherein connector prongs are provided and are readily movable from compact, folded, inoperative positions to extended operative positions and be resiliently retained in desired operative position.

Another object of the invention is to provide novel contact means in an electric cord reel assembly so that electrical energy is transmitted to the pulley journalled in the reel assembly and which contacts are operative only at desired positions of the pulley.

The foregoing and other objects and advantages of the invention will be made more apparent as the specification proceeds.

Reference now is particularly directed to the accompanying drawings which disclose one currently preferred embodiment of the invention and wherein.

Figure 1:
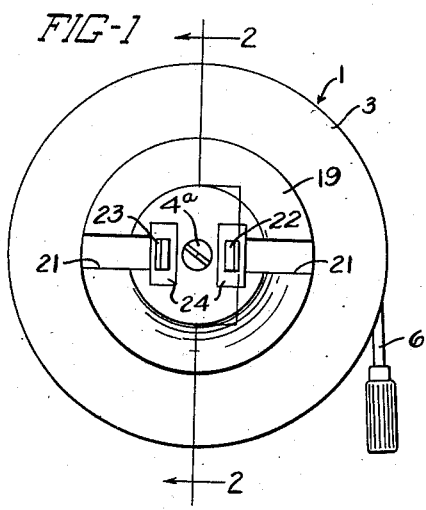
Fig. 1 is a side elevation of an electric cord reel embodying the principles of the invention.
Figure 2:
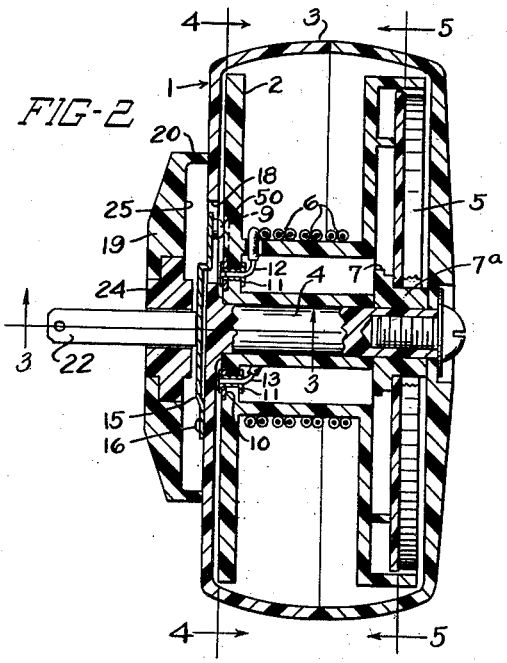
Fig. 2 is an enlarged vertical section taken on line 2—2 of Fig. 1.
Figure 4:
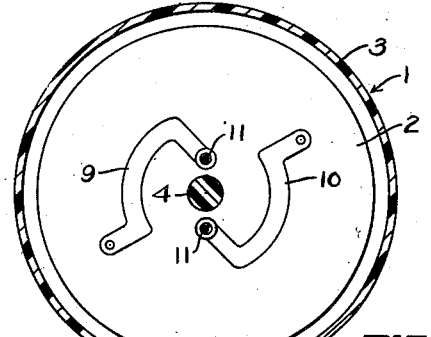
Figure 5:
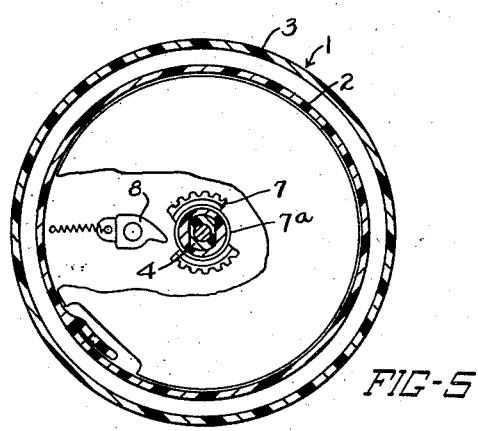
Figure 6:
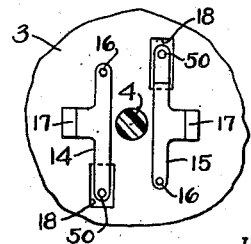

Figs. 4 and 5 are vertical sections taken on lines 4—4 and 5—5 of Fig. 2, respectively; and Fig. 6 is a fragmentary elevation of part of the contact means on the reel case.

When referring to corresponding parts shown in the accompanying drawings and referred to in the specification, corresponding numerals are used to facilitate comparison between such equivalent parts.

The present invention, generally speaking, relates to a reel for an electric cord, which reel comprises a pulley for receiving convolutions of the cord, a case in which the pulley is journalled, a pair of contact prongs, means journalling the contact prongs on part of the case for movement to and from operative positions thereon, a pair of brushes secured to the case for engaging the contact prongs when swung to operative positions wherein the prongs extend substantially normally from the case, and contact means of limited arcuate extent on the pulley for resiliently engaging the brushes which are forced against such contact means by the contact prongs when operatively positioned so as to transmit electrical energy to said pulley at such time.

Reference now should be had to the details of the structure shown in the drawings, and a reel of the invention is indicated as a whole by the numeral 1 in the drawings. The reel 1 includes a pulley 2 that is journalled within a case 3 as by means of a shaft or hub 4 that receives the pulley thereon. Cap screws 4a engage the shaft to hold the components of the case 3 together. A control spring 5 is provided within the case 4 and is suitably secured between the case 3 and pulley 2 for use in rotating the pulley 2 for automatically rewinding an electric cord 6 on the pulley as a number of convolutions of cord are normally carried by the pulley 2.

As shown in Fig. 5 of the drawings, the pulley 2 may have arcuate gear segments or means 7 on a separate hub member 7a, which gear segments 7 are engaged by a pawl 8 journalled on the reel so that the pulley 2 can be locked in a given arcuate position within the reel 1 when the pawl 8 engages one of the gear teeth in the segment 7. The member 7a is suitably secured to the shaft 4. All of these previous components of the reel 1 have been previously disclosed in various issued patents so that these elements are of conventional, or standard construction.

The pulley 2 carries a pair of leaf, or arcuate contacts 9 and 10, as shown in Fig. 4, that are of any desired length and normally are positioned on and secured to the pulley 2 by conventional rivet means 11. These rivets 11 extend through a portion of the pulley to the inner surface thereof and have individual engagement with a pair of leads 12 and 13 extending from the electric cord 6 for supply of electrical energy thereto at desired portions of the rotation of the pulley 2, as hereinafter described. Usually the outer wall or surface of the pulley 2 is recessed for receipt of the contacts 9 and 10.

As a feature of the improved reel of the invention, a pair of resilient contact brushes 14 and 15 are secured at one end, as by means of rivets 16, or equivalent means, to a portion of the case 3 on the outer surface thereof. As best indicated in Fig. 2, these brushes 14 and 15 have center portions that bridge over or are spaced from the associated surface of the case 3 and they have resilient or spring fingers 17 extending therefrom. These brushes each carry a contact tip 50 at their free ends to extend through suitable slots or openings 18 provided in the adjacent surface of the case 3 so that the contact tips 50 can extend axially inwardly of the reel 1 for resilient engagement with the contacts 9 and 10, as hereinafter described in more detail.

Another special feature of the reel 1 is that of a cap or cover member 19, usually provided in the reel 1, covers a portion of the outer surface of one side of the case 3. The cap 19, and the case 3, and pulley 2 are all normally made from a suitable insulating plastic material. This cap 19 usually has an edge flange 20 extending therefrom and the cap has a pair of diametrically extending, but spaced opposed slots or recesses 21 provided therein on the outer surface thereof. Such recesses 21 are provided for receiving a pair of contacts, contact bars, or contact prongs 22 and 23, when such contact prongs are inoperatively positioned to extend along the surface of the cap 19 so that a compact reel is provided when it is not in use. These contact bars or prongs 22 and 23 are adapted to be swung to operative positions at which time they extend substantially normally from the cap 19. To this end, each of the contact prongs is positioned by a suitable journal member or pin 24 journalled in a recess 25 provided in the inner surface of the cap 19. These recesses 25 are specially contoured for positioning the contact prongs 22 and 23 for pivotal action when the components of the reel are assembled with relation to each other. The cap 19 can be secured to the case 3 by one of the cap screws 4a. The pins 24 may be molded around or cemented to the contact prongs and a rib 24a on the pins 24 engages a space provided extending across the prongs by spacing the ends of the doubled over metal strip from which the prongs are made.

Figure 3:
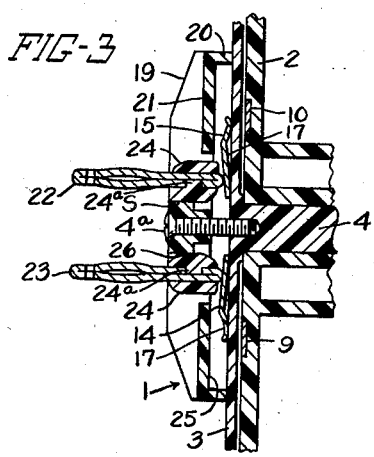
Fig. 3 is a fragmentary horizontal section taken on line 3—3 of Fig. 2.

Fig. 3 of the drawings best shows that the pins 24 have a special sectional shape and that opposed corners of these pins 24 are rounded, or are of arcuate contour whereas one portion of the pin 24, indicated at the surface S thereof, is substantially parallel to the contact prong positioned in such pin. Thus the surface S of each pin is adapted to abut against a corresponding surface or shoulder 26 provided on the cap 19 at oppositely directed center portions thereof so that the contact pins or prongs 22 and 23 can be swung arcuately to extend substantially normally from the cap 19 and further pivotal movement is prevented. This positions the contact prongs properly for operative use thereof. At such time, the inner ends of the contact prongs 22 and 23 resiliently engage the center portions of the brushes 14 and 15 and force the brushes axially inwardly of the reel, which aids in retaining the prongs in their operative positions. The contact tip 50 on each of the brushes is forced through the slots 18 into resilient engagement with the contacts 9 and 10 by the contact prongs 22 and 23 for transmission of electrical energy to the cord 6 for transfer of such energy therethrough.

Of course, as indicated hereinbefore, the reel 1 is particularly adapted for use with electrical shavers as made commercially today. Thus, the reel 1 is of compact size and is adapted to be permanently secured to an electrical wall outlet, if desired, and retain itself in engagement therewith. The cord 6 can be pulled from the pulley 2 to a desired length and be retained in a given position by use of the pawl 8. However, when it is desired to disengage the shaver from the cord 6, or when the shaver (not shown) is not used any more, the cord 6 can be completely rewound on the pulley 2 and be retained in such completely withdrawn position by the spring 5 without any engaging action of the pawl 8. Hence at such time, the contact prongs 22 and 23 still can be engaged with an electrical outlet, but no electrical energy will be transferred to the cord 6 on the reel 2 because of the special positioning of the contact segments 9 and 10 with relation to the locking action of the pawl 8 and associated means.

When the contact prongs 22 and 23 are swung in to collapsed positions, flat surfaces on the pins 24 bear on the brushes 14 and 15 which aid in resiliently holding the prongs collapsed. The contact prongs can be engaged with the pins 24 in any desired manner. It will be seen that the pins 24 are readily engageable with the cap 19 from the inner surface thereof and seat in the recesses provided therefor.

In view of the foregoing, it is submitted that the objects of the invention have been achieved and that a novel, compact but safe specialized reel has been provided particularly adapted for use with small electrical members, such as electric shavers.

While one complete embodiment of the invention has been disclosed herein, it will be appreciated that modification of this particular embodiment of the invention may be resorted to without departing from the scope of the invention as defined in the appended claims.

What is claimed is:

1. In a reel for an electric cord, a pulley for an electric cord, a case in which said pulley is journalled, a pair of leaf contacts secured to said pulley on an outer wall thereof, each of said leaf contacts extending over an arc having a length of about 90°, a pair of contact brushes secured to the outer surface of said case, said case having a pair of slots therein adjacent said contact brushes, spring arms extending from said contact brushes through said slots for electrical contact with said leaf contacts at portions of the rotation of said pulley, a cap secured over said contact brushes, and a pair of contact bars pivotally carried by said cap for movement from positions flush against said cap to positions extending normally therefrom at which time said contact bars resiliently engage said contact brushes.

2. In a reel for an electric cord, a pulley for an electric cord, a case in which said pulley is journalled, a pair of leaf contacts secured to said pulley on an outer wall thereof, each of said leaf contacts extending over an arc having a length of about 90°, a pair of contact brushes secured to the outer surface of said case, said case having a pair of slots therein adjacent said contact brushes, spring arms extending from said contact brushes through said slots for electrical contact with said leaf contacts at portions of the rotation of said pulley, means for locking said pulley in a given position only when said spring arms and said leaf contacts are engaged, a cap secured over said contact brushes, and a pair of contact bars carried by said cap for engaging said contact brushes.

3. In a reel for an electric cord, a pulley for the cord, a case in which said pulley is journalled, a cap on a side of said case, a pair of contact prongs, means journalling said contact prongs on said cap, a pair of brushes secured to said case for individually engaging said contact prongs when swung to operative positions, said means bearing on said cap to limit movement of said contact prongs to positions substantially normal to said cap, and contact means on said pulley for engaging said brushes to transmit electrical energy to said pulley, said contact means being of limited arcuate length so that electrical energy can be transmitted to said pulley only at desired rotational positions thereof.

4. In a reel as in claim 3, means for locking said pulley in a given rotative position, said lock means being of limited arcuate length and only engaging said pulley in the rotational positions of said pulley at which said brushes and contact means also engage.

5. In a reel for an electric cord, a pulley for the cord, a case in which said pulley is journalled, a cap on a side of said case, a pair of contact prongs, pin means journalling said contact prongs on said cap for movement from a position flush against said cap to an operative position extending normally therefrom, a pair of brushes secured to said case for resilient engagement with the inner ends of said contact prongs when swung to operative positions, said pin means bearing on said cap to limit movement of said contact prongs to a position of substantially normal to said cap, and contact means on said pulley for engaging said brushes, said brushes being resiliently forced against said contact means by said contact prongs when operatively positioned.

6. In a reel for an electric cord, a pulley for the cord, a case in which the pulley is journalled, a pair of contact prongs, means journalling said contact prongs on said case for movement to operative positions extending from said case substantially parallel to each other and to inoperative positions lying against said case, a pair of brushes secured to said case for engaging said contact prongs when swung to operative positions, and contact means on said pulley for engaging said brushes to transmit electrical energy to said pulley.

7. In a reel for an electric cord, a pulley for the cord, a case in which the pulley is journalled, a cap on said case, a pair of contact prongs, means journalling said contact prongs on said cap for movement to and from operative positions, a pair of resilient brushes secured to said case, said contact prongs bearing on said brushes when swung to operative positions to move said brushes axially inwardly of the case, and contact means on said pulley for engaging said brushes to transmit electrical energy to said pulley.

References Cited in the file of this patent

UNITED STATES PATENTS

| | | |
|---|---|---|
| 2,007,699 | Wiebking | July 9, 1935 |
| 2,323,736 | Tousley | July 6, 1943 |
| 2,538,296 | Crocker | Jan. 16, 1951 |